Patented Sept. 7, 1943

2,328,846

UNITED STATES PATENT OFFICE 2,328,846

CATALYTIC CONVERSION PROCESS

Edgar C. Pitzer, Chicago, Ill., assignor to Standard Oil Company, Chicago, Ill., a corporation of Indiana No Drawing. Application August 17, 1942,
Serial No. 455,119

14 Claims. (Cl. 196—10)

This invention relates to the process of converting hydrocarbon oils with catalysts and more particularly to conversion with an alumina catalyst prepared in a particular manner. According to this process gas oil may be converted into gasoline and gasoline may be treated to increase the knock rating. Unsaturated hydrocarbon gases may also be polymerized to heavier hydrocarbons by contacting with the alumina catalyst. One object of the process is to provide a catalyst with a long life and higher temperature stability. Another object of the process is to effect the cracking of gas oil and heavy hydrocarbon oil, in general, by contacting at conversion temperature with a catalyst consisting essentially of alumina. Still another object is to provide a cracking process operable at relatively quite low conversion temperatures.

The catalyst employed in my process is prepared from metallic aluminum by dissolving in dilute acid to produce an alumina sol, then coagulating or gelling the sol by the addition of hydrofluoric acid. The resulting gel is then dried and ignited to produce the desired catalyst. Formation of the alumina sol from the metal is brought about by first amalgamating the metal with mercury which may be done in several ways. The metal in the form of foil, pellets, wire, turnings, etc., may be dipped in a solution of nitric acid containing mercury nitrate. The metal quickly becomes amalgamated and is then transferred to the dilute acid solution where it dissolves. The method employed is similar to that described in U. S. Patents 2,274,633 and 2,274,634.

The metal may also be amalgamated by adding mercuric oxide to the dilute acid solution employed for dissolving the metal. Thus a small amount of mercuric oxide may be dissolved in an acetic acid solution of about 1 to 5% concentration and clean, pure aluminum metal added to the solution and agitated until substantially dissolved.

After the aluminum is dissolved most of the mercury can be separated.

The acid employed for dissolving the aluminum is preferably an organic acid such as formic, acetic, citric, tartaric, chloracetic, trichloracetic, etc. Strictly speaking, the acid does not "dissolve" the aluminum since the quantity of acid is far less than required to give a neutral salt and the solution is not a true solution but a colloidal solution in which aluminum oxide is peptized by the acid. The principal reaction is between the aluminum and the water. Formic acid possesses the advantage of producing an alumina sol of lower viscosity and the resulting alumina gel, after drying, can be heated and ignited substantially without the formation of carbon which is ordinarily obtained when employing other organic acids. The ignition of the catalyst is therefore somewhat facilitated by using formic acid, inasmuch as it is not necessary in this case to control the air supply to the catalyst during ignition to prevent local overheating resulting from the combustion of carbonaceous deposits.

After the alumina sol has been prepared in the manner just described, a solution of hydrofluoric acid is cautiously added with stirring. An alumina gel forms rapidly and if the gelling operation is carefully controlled the resulting jelly will be firm, substantially transparent, and vibrant. The gelation may be conveniently carried out in aluminum trays in thin layers to facilitate drying the gel. After drying at room temperature or somewhat above, the gel is slowly heated to 900 to 1100° F. It may be held at 1000 to 1400° F. for a period of time, e. g., 24 to 48 hours, to activate by calcination. The $Al_2O_3$ seems to be chemically modified by this treatment. The product is a translucent, hard, granular material of perhaps about 2 to 14 mesh and may be further ground and pelleted, if desired.

The following is an example of the procedure employed in making my improved alumina catalyst:

An alumina sol was prepared by adding approximately 500 grams of metallic aluminum to 20 liters of 1% acetic acid containing a small amount of mercuric acetate in solution. A vigorous reaction ensued accompanied by a rise in temperature to about 150 to 180° F. Additional acetic acid was added to maintain the reaction until the aluminum was substantially all dissolved. The resulting alumina sol contained 50.9 grams $Al_2O_3$ per liter.

To 20 liters of the sol there was then added, with thorough agitation, 1 liter of an 8% HF solution. The sol was immediately poured into shallow aluminum trays where within a short time it set to a solid jelly. The jelly or gel was dried by heating in an oven at a slowly increasing temperature. Acetic acid was removed from the dry gel by heating in an atmosphere of nitrogen at 900° F. for eight hours. It was then heated in air for twelve hours at 900° F. The resulting alumina gel was a hard, translucent, granular material. After grading to size it may be used in granular form or may be pelleted.

It will be noted that when made in this way no washing of the catalyst whatever is necessary. It is preferred to employ organic acids as peptizing agents for the alumina sol because of the ease of eliminating the acid from the gel by heating and ignition. After igniting, the catalyst may be further heated at higher temperature, preferably about 1100° F., to effect further activation by calcining.

The remarkably high activity of the catalyst, the preparation of which has just been described, is illustrated by the following data which were obtained on cracking 35° A. P. I. Mid-Continent gas oil employing two-hour reaction periods with a space velocity of 1 volume of oil per hour per volume of catalyst.

| Temperature | 925 | 850 | 750 | 650 | 550 |
|---|---|---|---|---|---|
| Run number | 1 | 2 | 3 | 4 | 5 |
| Gasoline—10 lb. Reid vapor pressure volume per cent | 34.9 | 36.3 | 34.4 | 29.5 | 12.5 |
| Excess C₄ volume per cent | 17.0 | 12.6 | 8.3 | 1.9 | Below 1.7 |
| Cycle gas oil volume per cent | 35.8 | 46.2 | 58.3 | 72 | 86.2 |
| Dry gas weight per cent | 14.3 | 8.9 | 3.5 | 1 | Below 1.7 |
| Carbon deposit weight per cent | 7.1 | 4.6 | 2.9 | 1.9 | 1 |
| Octane number A. S. T. M. | 82.7 | 81.3 | 79.4 | ---- | ---- |

It will be noted from the foregoing data that the gasoline-producing activity of this catalyst is substantially independent of the temperature between 750 and 925° F. The extraordinarily high activity of this catalyst is shown by its ability to produce 12½ per cent of gasoline at a temperature as low as 550° F. and a space velocity which is commonly employed in commercial operations with catalysts now in use at far higher temperatures. At lower space velocities the conversion at 550° F. would, of course, be greater.

In addition to the cracking of gas oil, I may also employ this alumina catalyst for re-processing cracked gasoline which has been prepared by thermal or catalytic conversion processes. The high activity of my catalyst makes it suitable for re-processing gasoline thruout a wide range of temperature from 550 to 950° F., generally at space velocities of 0.5 to 10 volumes of gasoline per hour per volume of catalyst. Steam may be added to the gasoline vapor during the re-processing operation and the re-processed gasoline is found to have a better response to tetraethyl lead added for the improvement of knock rating.

When re-processing gasoline with this catalyst, the hot vapors from a cracking or reforming operation can be conducted immediately thru the HF activated alumina gel catalyst while adjusting the temperature, for example to about 550 to 750° F. by cooling the vapors. Thus a gas oil or other heavy charging stock may be cracked with an alumina-silica catalyst at a temperature of about 850 to 1050° F. and space velocity of 1 volume of oil per hour per volume of catalyst, and the hot vapors may be passed at a temperature of about 600–800° F. thru an HF gelled alumina. Reprocessing has the effect of reducing the unsaturation of the gasoline, making it more suitable for aviation use in particular. This is indicated by a reduction in the acid heat test, which in one example fell from 100–150° F. down to 20–40° F.

I have also found that my hydrofluoric acid gelled alumina catalyst is a valuable polymerization catalyst for the conversion of unsaturated hydrocarbon gases into gasoline. Thus when a gas containing ethylene, propylene or butylene is passed in contact with the catalyst at elevated temperature, the unsaturated hydrocarbons are polymerized to a large extent into hydrocarbons boiling within the gasoline boiling range. As an example, a commercial propylene was passed thru the catalyst at 500° F. and 200 p. s. i. pressure. A contact velocity of 0.4 pound of propylene per hour per pound of catalyst was employed. Under these conditions there was formed 0.24 pound of gasoline polymer per hour per pound of catalyst.

The conditions generally applicable to the polymerization of olefins with my HF gelled alumina catalyst are about 250 to 900° F. with a preferred temperature range of about 350 to 650° F. and a pressure of about 150 to 1500 p. s. i., with the preferred pressure being about 200 to 700 p. s. i. Contact velocities of about 1 to 5 pounds of gas per hour per pound of catalyst are generally satisfactory, although higher or lower velocities may be employed, e. g., as high as 10 and as low as 0.1.

Mixtures of unsaturated and saturated hydrocarbon gases may be subjected to the action of the catalyst and I prefer to treat the gaseous hydrocarbon fractions obtained in the various hydrocarbon conversion processes, especially the C₃ and/or C₄ fractions. By operating at high temperatures, for example about 850 to 950° F. or higher, a certain amount of alkylation of paraffin hydrocarbons results when processing a gaseous mixture of olefins and paraffins.

In a modification of my invention I may incorporate active silica in the HF gelled alumina catalyst particularly for use in cracking and re-processing operations. Various forms of active silica may be employed for this purpose such as kieselguhr and silica gel. When using silica gel, a silica hydrogel may be intimately mixed with the alumina jelly or hydrogel before drying, or the dry silica gel may be mixed in a ball mill with the dry alumina gel either before or after igniting. In still another method, the hydrogel of either constituent may be mixed with the dried gel of the other constituent. Silica gel employed for this purpose should be washed substantially free of alkali metals in order to produce the best catalysts. This is especially important with silica gel prepared from sodium silicate and an acid. Freezing and thawing of the gel facilitates washing. The proportion of alumina in the combination catalyst may vary over a wide range, preferably from about 10 to 90 per cent. The catalyst may be pelleted in any desired size, pellets of one-eighth to three-eighths inch being commonly employed.

The amount of hydrofluoric acid used in preparing my improved alumina catalyst is ordinarily only that amount which is necessary to effect gelation of a stable alumina sol. In general, the amount will vary from 0.5 to 6 per cent of the alumina contained in the sol, and I prefer to add the hydrofluoric acid in a concentration of about 1 to 5 per cent. Care should be taken to prevent contamination of the acid by contact with iron or metals. The acid may be handled conveniently in vessels coated with wax, resins, or rubber compositions, and similar vessels may be employed in preparing the catalyst.

Alumina sols prepared in other ways may also be gelled with HF to give catalysts of high activity. Thus, an $Al_2O_3$ sol may be made from freshly precipitated and washed aluminum hydroxide by peptizing with acetic acid, chloroacetic acid, formic acid or other suitable organic acid.

Small amounts of other elements may be added to my alumina catalyst as promoters for certain reactions. Thus, I may add about 2 to 15 percent of metals of the 5th and 6th groups of the periodic system, such as vanadium, chromium and molybdenum. Molybdenum particularly has the effect of enhancing the dehydrogenating characteristics of the catalyst. The promoter, for example 5 to 10 percent of molybdenum oxide, may be added as a solution of a water-soluble salt, either to the alumina sol or to the dry alumina gel before or after ignition. An ammonium molybdate solution may be applied in this way. When adding molybdenum to the sol, some advantage results from the use of complex molybdenum salts such as oxalo-molybdic acid, tartaro-molybdic acid, citro-molybdic acid, etc. A solution of the complex salt may be added to the alumina sol simultaneously with the addition of hydrofluoric acid.

Altho I have described my invention with respect to specific applications, it should be construed in accordance with the following claims.

I claim:

1. The process of converting hydrocarbons which comprises contacting said hydrocarbons at conversion temperature with an alumina catalyst prepared by coagulating an alumina sol with hydrofluoric acid and drying and igniting the resulting alumina gel.

2. The process of converting hydrocarbons which comprises contacting said hydrocarbons at conversion temperature with an alumina catalyst prepared by dissolving amalgamated aluminum metal in a dilute acid to form an alumina sol, gelling said sol by the addition of hydrofluoric acid thereto, and drying and igniting the resulting gel.

3. The process of converting hydrocarbon oils into high knock rating gasoline which comprises contacting said oils at conversion temperature with an alumina catalyst prepared by coagulating an alumina sol with hydrofluoric acid and drying and igniting the resulting alumina gel.

4. The process of converting hydrocarbon oils into high knock rating gasoline which comprises contacting said oils at conversion temperature with an alumina catalyst prepared by dissolving amalgamated aluminum metal in a dilute acid to form an alumina sol, gelling said sol by the addition of hydrofluoric acid thereto, and drying and igniting the resulting alumina gel.

5. The process of increasing the knock rating and lead susceptibility of cracked gasoline which comprises contacting the vapors of said gasoline at a temperature of about 550 to 950° F. with an alumina catalyst prepared by coagulating an alumina sol with hydrofluoric acid, and drying and igniting the resulting alumina gel.

6. The process of increasing the knock rating and lead susceptibility of cracked gasoline which comprises contacting the vapors of said gasoline at a temperature of about 550 to 950° F. with an alumina catalyst prepared by dissolving amalgamated aluminum metal in a dilute acid to form an alumina sol, gelling said sol by the addition of hydrofluoric acid thereto, and drying and igniting the resulting alumina gel.

7. The process of converting heavy hydrocarbon oil into high knock rating gasoline which comprises subjecting said oil in vapor phase to cracking temperature, thereby effecting partial conversion to gasoline, contacting the converted vapors, while still hot, with a re-processing catalyst consisting essentially of aluminum oxide prepared by gelling an alumina sol with hydrofluoric acid, drying and igniting the resulting alumina gel and separating gasoline from the reprocessed vapors.

8. The process of claim 7 wherein cracking of said oil is effected by contacting it with a cracking catalyst.

9. In the process of converting hydrocarbons into high knock rating gasoline by the action of catalyst, the improvement comprising contacting at polymerization temperature an olefine hydrocarbon gas with a catalyst consisting essentially of aluminum oxide prepared by gelling an alumina sol with hydrofluoric acid, drying and igniting the resulting alumina gel, and recovering gasoline from the reaction products.

10. A hydrocarbon conversion catalyst comprising an aluminum oxide gel prepared by gelling an alumina sol with hydrofluoric acid and drying and igniting the resulting gel.

11. A hydrocarbon conversion catalyst comprising an aluminum oxide gel prepared by dissolving amalgamated aluminum metal in a dilute organic acid peptizing agent to produce an alumina sol, gelling said sol by adding hydrofluoric acid thereto and drying and igniting the resulting alumina gel.

12. The catalyst of claim 11 in combination with active silica.

13. A silica-alumina cracking catalyst prepared by mixing silica gel with alumina gel made by gelling an alumina sol with hydrofluoric acid and subsequently drying and igniting.

14. A silica-alumina cracking catalyst prepared by mixing silica hydrogel with alumina hydrogel resulting from gelling an alumina sol with hydrofluoric acid and drying and igniting the mixed hydrogels.

EDGAR C. PITZER.